United States Patent [19]

Kahn

[11] 4,191,848
[45] Mar. 4, 1980

[54] TELETYPEWRITER MOTOR CONTROLLING

[76] Inventor: William M. Kahn, Digital Laboratories, 600 Pleasant St., Watertown, Mass. 02154

[21] Appl. No.: 945,203

[22] Filed: Sep. 25, 1978

[51] Int. Cl.² ............................ H04L 7/00; H04N 1/32
[52] U.S. Cl. .................................. 178/4.1 R; 178/17.5; 178/23 R; 358/267
[58] Field of Search ................ 178/4.1 R, 17.5, 23 R, 178/17 R, 53, 53.1 R; 358/267, 268, 280

[56] References Cited

U.S. PATENT DOCUMENTS

| | | | |
|---|---|---|---|
| 3,643,022 | 2/1972 | Ferroglio | 178/17 R |
| 4,004,088 | 1/1977 | Heywang | 178/17.5 |
| 4,054,745 | 10/1977 | Norman | 178/4.1 R |

Primary Examiner—Thomas A. Robinson
Attorney, Agent, or Firm—Charles Hieken

[57] ABSTRACT

The first signal transition of a teletypewriter signal triggers a resettable one-shot that activates the motor run switch to turn the teletypewriter motor on for a minimum interval of from two seconds to several minutes and also is applied to the input of a shift register that digitizes and delays the teletypewriter input signal enough to allow the motor to reach operating speed, typically 600 milliseconds, before the delayed signal is applied to the Teletype printer. If no signal is received for a duration that exceeds the shift register delay, logical circuitry increases the shift pulse rate so that the delay shift register furnishes negligible delay. Absence of an input signal for an interval longer than the astable ON interval of the resettable one-shot deactivates the motor run switch.

10 Claims, 3 Drawing Figures

TELETYPEWRITER MOTOR CONTROLLING

BACKGROUND OF THE INVENTION

The present invention relates in general to teletypewriter motor controlling and more particularly concerns novel apparatus and techniques for eliminating motor noise and wear during off cycles with compact reliable apparatus that is easy to attach to a teletypewriter while dissipating relatively little energy.

In order to insure that every character is printed the teletypewriter motor must be running at normal operating speed when the first data signal reaches the machine. It is thus customary to leave teletypewriter machines including the motor running continuously although the machine will not be receiving messages for significant time intervals. This continuous operation results in undesired motor noise, extra power dissipation and increased motor wear.

Accordingly, it is an important object of the invention to provide methods and means for reducing teletypewriter motor noise, wear and power consumption.

It is another object of the invention to achieve the preceding object with apparatus that may be conveniently attached to existing teletypewriters.

It is still a further object of the invention to achieve one or more of the preceding objects with apparatus that facilitates bypass when desired.

It is still another object of the invention to achieve one or more of the preceding objects while effecting the bypass automatically.

It is still a further object of the invention to achieve one or more of the preceding objects with apparatus that is compact, reliable, dissipates relatively little power, especially in the quiescent mode, and is relatively easy and inexpensive to manufacture.

SUMMARY OF THE INVENTION

According to the invention, there is resettable one-shot means responsive to an input signal for providing a MOTOR ON signal for a predetermined duration in its astable interval that is longer than occasional intervals of interrupted data flow, delay means for furnishing a delay slightly greater than the "worst case" motor start interval, means responsive to the MOTOR ON signal for activating a teletypewriter motor switch for energizing the teletypewriter motor, and means for furnishing the delayed signal to the teletypewriter input so that printing occurs only when the teletypewriter motor is at operating speed. Preferably the delay means comprises an LSI shift register that digitizes the input signal. Preferably there is means for bypassing the delay function of the delay means for applying the input signal to the teletypewriter input without significant delay. According to an important aspect of the invention, there is means responsive to the absence of an input signal for a time interval greater than the motor start interval for bypassing the delay function of the delay means and furnishing the input signal to the teletypewriter input without significant delay while the MOTOR ON persists.

Numerous other features, objects and advantages of the invention will become apparent from the following specification when read in connection with the accompanying drawing in which:

DETAILED DESCRIPTION OF PREFERRED EMBODIMENTS

Figure 1:
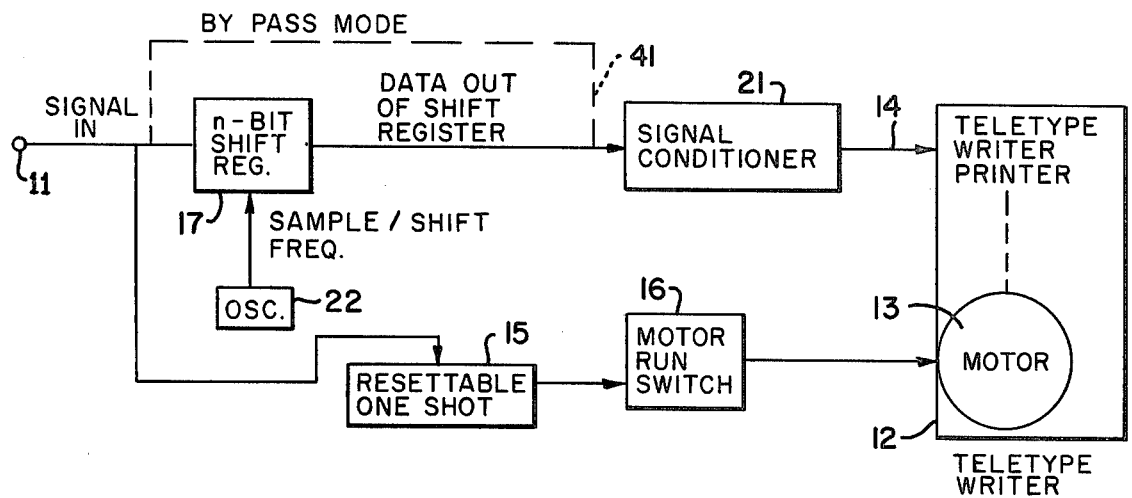
FIG. 1 is a block diagram illustrating the logical arrangement of a system according to the invention.

With reference now to the drawing and more particularly FIG. 1 thereof, there is shown a block diagram illustrating the logical arrangement of a system according to the invention. An input signal on input terminal 11 enables normally off teletypewriter motor 13 in teletypewriter 12 and is furnished on teletypewriter printer input 14 of the teletypewriter printer after a delay interval sufficient to allow motor 13 to reach operating speed. Input terminal 11 is coupled to a resettable one-shot 15 that provides a MOTOR ON signal to motor run switch 16 for a time interval greater than and preferably many times greater than the motor start interval required for motor 13 to reach operating speed when stopped after being energized by motor run switch 16. An n-bit shift register 17 has its input coupled to input terminal 11 and comprises delay means for furnishing a delay to the signal on terminal 11 and has its output coupled to signal conditioner 21 which has its output coupled to the input 14 of the printer of teletypewriter 12. Oscillator 22 provides sample/shift pulses to shift register 17.

Figure 2:
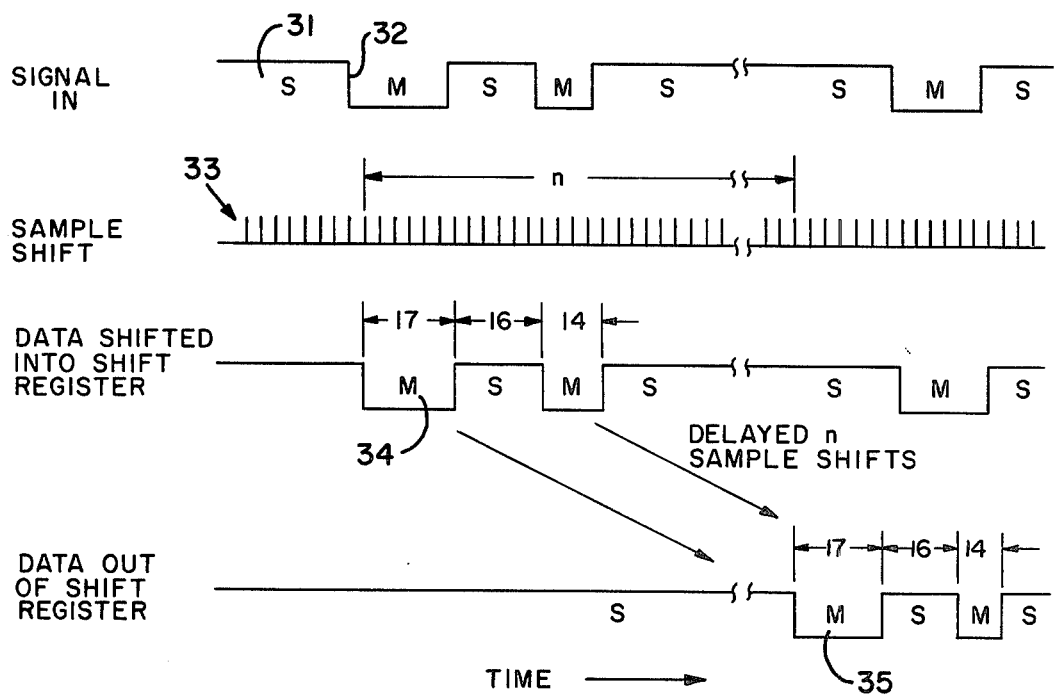
FIG. 2 is a graphical representation of signal waveforms plotted to a common scale helpful in understanding the mode of operation.

Having briefly described the physical arrangement of a system according to the invention, the mode of operation will be discussed. Referring to FIG. 2, there is shown a graphical representation of signal waveforms plotted to a common time scale helpful in understanding the principles of operation.

Waveform 31 is a typical teletypewriter signal in which data is represented by a sequence of code pulses in the Baudot or ASCII codes in which negative and positive currents designate marking and spacing intervals, respectively. The letters M and S designate mark and space intervals, respectively, in a typical signal waveform. Thus, waveform 31 illustrates a sequence of two mark intervals separated by a short space interval and much later a single mark interval. The first transition 32 in waveform 31 triggers resettable one-shot 15 to produce a MOTOR ON output signal that keeps motor run switch 16 energized for the duration of the occurrence of an input signal on terminal 11 containing at least some mark intervals. Each subsequent transition in waveform 31 resets resettable one-shot 15 so that the occurrence of the MOTOR ON signal is correspondingly extended, terminating a time after the occurrence of the last signal transition corresponding to the time in which resettable one-shot remains in the astable state after receiving a transition, an astable interval typically from two seconds to several minutes.

Oscillator 22 continuously provides the sample/shift pulses 33 to shift register 17, causing shift register 17 to receive a series of binary ONES and ZEROS during space and mark intervals, respectively, and advancing the input sequence of bits to the output at a rate determined by the frequency of oscillator 22, typically about 16 per minimum mark or space interval, that provides sufficient samples of the signal input to prevent unacceptable distortion. Clock pulse accuracy is not critical because the sampling interval from shift register input to output only differs by the frequency drift of the clock pulse signal over the delay interval itself, a drift that is negligible from the practical standpoint.

Waveform 34 represents the data shifted into shift register 17 as a sequence of ONES and ZEROS during space and mark intervals, respectively. Waveform 35 represents the data out of shift register 17 applied to signal conditioner 21 showing the first three intervals with significant information delayed. The result of this arrangement is that motor 13 is normally idle when the input signal on terminal 11 carries no meaningful information. When a transition occurs, motor run switch 16 immediately energizes motor 13, which attains full operating speed in about 600 milliseconds. Thereafter, signal conditioner 21 delivers the input data to teletypewriter input 14 for printing. When resettable one-shot 15 returns to its stable state upon the absence of a transition on input terminal 11 for the period of its astable state following excitation by the last transition, motor run switch 16 deenergizes motor 13, returning teletypewriter 12 to its quiescent state with motor 13 quiet, resting and not drawing power. Thus, the invention saves wear and energy and reduces noise.

A feature of the invention resides in the bypass mode designated schematically by broken line 41 which establishes a path around shift register 17 when delay is not desired. This feature takes advantage of the realization that with the motor at running speed and the absence of input signal data for a time interval corresponding to that furnished by shift register 17, the input signal data may be applied to the teletypewriter input 14 without delay without confusing the teletypewriter and thus effect prompt printing of the received data. This feature is especially advantageous in full duplex operation of teleprinters with computers and avoids echoing back operator delayed keyboard entries from the computer, a condition which would otherwise occur with the 0.6 second delay introduced by shift register 17. A preferred technique for effecting the bypass mode is to increase the shift pulse rate to a frequency so high, typically 1 MHz, that the delay furnished is insignificant.

Figure 3:
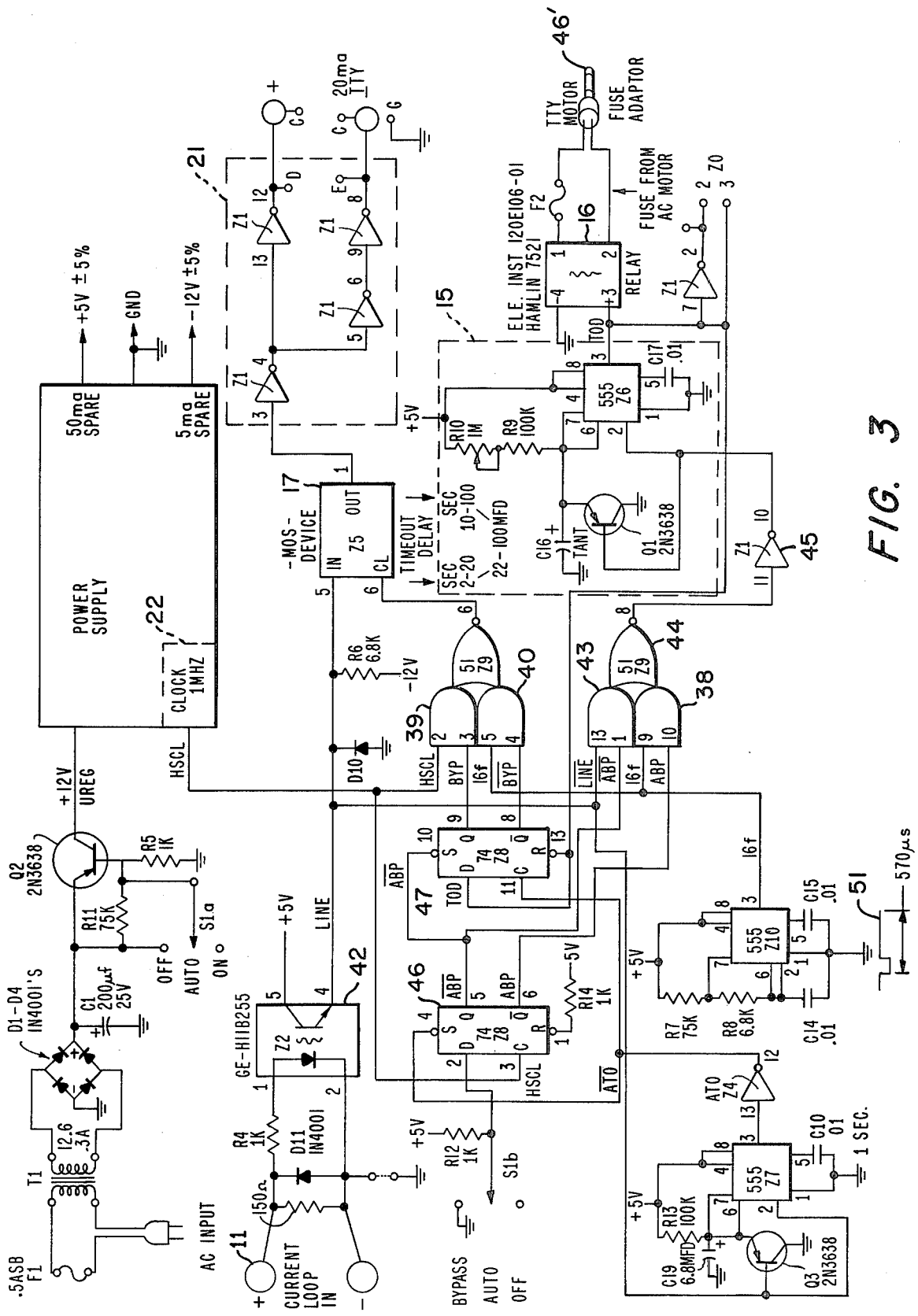
FIG. 3 is a combined schematic-block diagram of a commercially available embodiment of the invention.

Referring to FIG. 3, there is shown a combined schematic circuit-detailed block diagram of a commercially available embodiment of the invention, the TR-20 motor control system available from Digital Laboratories of Watertown, Massachusetts, the structure of which is incorporated by reference herein. Since those skilled in the art will be able to practice the invention from the schematic circuit diagram itself, the discussion which follows concerns only those elements helpful in understanding the principles of operation of the invention. Corresponding elements are identified by the same reference numerals throughout the drawing, and broken lines embrace plural elements embodying a block in FIG. 1. Input terminal 11 comprises a current loop coupled to the input of shift register 17 by an optical isolator 42. The circuitry comprises ten integrated circuits designated Z1–Z10 with the various terminal connections indicated on FIG. 3.

The input transitions are coupled to the resettable one-shot 15 through AND-OR-INVERT GATE 43, 44, and logical inverter 45 to trigger resettable one-shot 15 with potentiometer R10 and resistor R9 permitting adjustment of the astable interval defining time out delay from two to 20 seconds with capacitor C16 22 microfarads and from 10–100 seconds with capacitor C16 100 microfarads. When in the astable condition, resettable one-shot 15 provides a MOTOR ON signal to motor run switch 16, typically comprising an optical relay that provides operating power through fuse F2 through a fuse adapter connector 46' that replaces the fuse associated with an existing teletypewriter motor.

Switch S1A is ganged with switch S1B for selecting off, bypass and automatic positions. In the off position, the emitter of transistor Q2 is connected to its base and delivers no current to the power supply, and switch 16 therefore remains open so that motor 13 remains off. In the bypass position the D terminal of flip-flop 46 is grounded to keep flip-flops 46 and 47 conditioned so that the BYP signal is provided to enable gate 39 and deliver high speed clock pulses from the 1 mHz clock pulse source 22 to the shift input CL on shift register 17. These pulses on the HSCL line advance the 1024-bit shift register 17 so rapidly that the delay it furnishes is negligible.

In the AUTO position, the absence of an input signal transition for more than a second produces an $\overline{\text{ATO}}$ signal applied to input C of flip-flop 47 that also produces the BYP signal to effect the bypass mode. Transistor Q3 and integrated circuit Z7 comprise a second resettable one-shot having an astable state of substantially one second that provides an $\overline{\text{ATO}}$ signal to the S or set input of flip-flop 46 upon returning to its stable state causing flip-flop 46 to provide an ABP signal that enables gate 38 to keep one-shot 15 in its astable state in response to each slow clock pulse. The not in bypass mode signal ABP enables AND gate 43 for providing a triggering signal to resettable one-shot 15 in response to each input transition.

Integrated circuit Z10 and associated components are a free running assymetrical multivibrator providing the slow clock pulses of waveform 51 designated 16f having a period of 570 microseconds that is also applied to the shift input CL of shift register 17 when gate 40 is enabled by the occurrence of a not bypass $\overline{\text{BYP}}$ signal.

There has been described novel apparatus and techniques for reducing Teletypewriter motor noise, wear and power consumption with circuitry that is reliable, relatively inexpensive and easy to operate and offers wide flexibility to the user.

It is evident that those skilled in the art may now make numerous uses and modifications of and departures from the specific embodiments described herein without departing from the inventive concepts. Further, the invention may be applied to other serial communications and Teletype compatible devices such as the DecWriter and GE Terminet. It may also be applied to video displays. Consequently, the invention is to be construed as embracing each and every novel feature, and novel combination of features present in or possessed by the apparatus and techniques herein disclosed and limited solely by the spirit and scope of the appended claims.

What is claimed is:

1. Teletypewriter motor controlling apparatus comprising,
    motor switching means for selectively enabling the teletypewriter motor,
    an input terminal for receiving a teletypewriter signal,
    means for periodically sampling the signal received on said input terminal to provide a sequence of sample signals characteristic of the received signal, means responsive to the occurrence of a transition in a teletypewriter signal on said input terminal for enabling said switching means for a predetermined fixed period longer than the motor start interval for a teletypewriter motor to attain normal operating speed upon being energized after being in a stationary condition, means for furnishing a fixed delay to the sample signals slightly greater than said motor start interval, and means for furnishing the delayed sample signals to the input of a teletypewriter for enabling the latter to print the teletypewriter signal applied to said input terminal only after the teletypewriter motor is at normal operating speed.

2. Teletypewriter motor controlling apparatus in accordance with claim 1 wherein said delay means comprises a shift register.

3. Teletypewriter motor controlling apparatus in accordance with claim 1 and further comprising, means responsive to the absence of a transition on said input terminal for a time interval greater than said motor start interval while said motor switching means is enabled for inhibiting the delay function of said delay means and furnishing the teletypewriter input without significant delay so long as said motor switching means remains energized.

4. Teletypewriter motor controlling apparatus in accordance with claim 2 and further comprising, means for storing in said shift register discrete samples of the signal on said input terminal.

5. Teletypewriter motor controlling apparatus in accordance with claim 3 wherein said delay means comprises a shift register and said means for inhibiting the delay function comprises means for increasing the shifting frequency of said shift register such that the delay time through the shift register is negligible compared to the duration of a mark interval in an input teletypewriter signal on said input terminal.

6. Teletypewriter motor controlling apparatus in accordance with claim 5 wherein said shift register has an input for receiving discrete samples of the input signal on said input terminal, an output terminal for furnishing the input signal samples delayed, and a clock input for receiving shift pulses, a source of slow clock pulses,
a source of fast clock pulses,
and logical circuit means for selectively coupling said slow and fast clock pulses to said clock input to cause said shift register to furnish significant and negligible delay respectively.

7. Teletypewriter motor controlling apparatus in accordance with claim 6 and further comprising, a one-shot responsive to the absence of a transition on said input terminal for a time interval greater than said motor start interval for providing a conditioning signal to said logical circuit means to cause said logical circuit means to change from coupling said slow clock pulses to said clock input to coupling said fast clock pulses to said clock input.

8. Teletypewriter motor controlling apparatus in accordance with claim 2 and further comprising, means including an electro-optical isolating circuit for coupling said input terminal to the input of said shift register.

9. Teletypewriter motor controlling apparatus in accordance with claim 1 wherein said means responsive to the occurrence of a transition in a teletypewriter signal on said input terminal for enabling said switching means comprises a one-shot.

10. Data processing communication apparatus comprising, switching means for selectively enabling said data processing communication apparatus to process input digital data signals, an input terminal for receiving a digital data signal to be processed by said data processing communication apparatus, means responsive to the occurrence of a transition in a digital data signal on said input terminal for enabling said switching means for a predetermined fixed period longer than the data processing communications apparatus start interval for said data processing communication apparatus to attain normal operating speed upon being energized after being in a nonoperating condition, means for periodically sampling the digital data signal received on said input terminal to provide a sequence of sample signals characteristic of the received signal, means for furnishing a fixed delay to the sample signals slightly greater than said start interval, and means for furnishing the delayed sample signals to the input of said data processing communication apparatus for enabling the latter to process the digital data signals applied to said input terminal only after the data processing communication apparatus is at normal operating speed.

* * * * *